Dec. 8, 1959  R. W. STOTT  2,915,959
STEAK COOKER
Filed Dec. 19, 1958  2 Sheets-Sheet 2
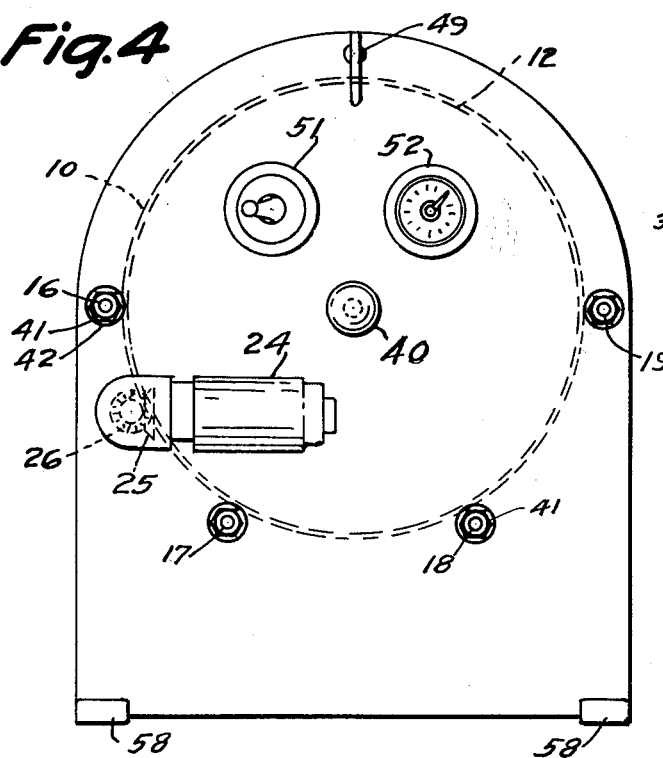
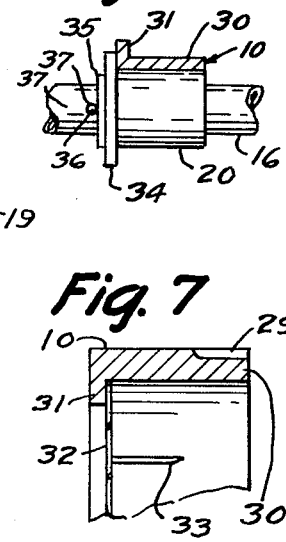
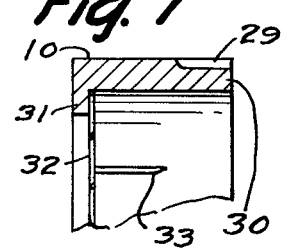
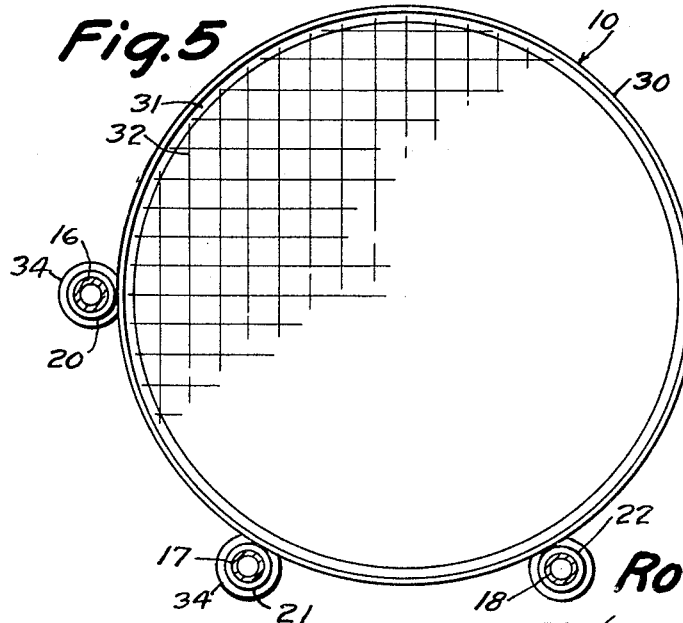
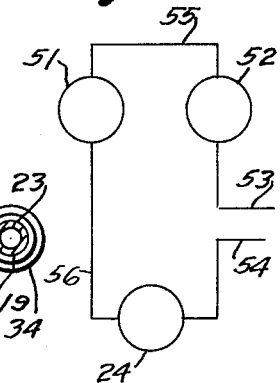
INVENTOR
*Roy Walter Stott*
BY *James Harrison Bowen*
ATTORNEY

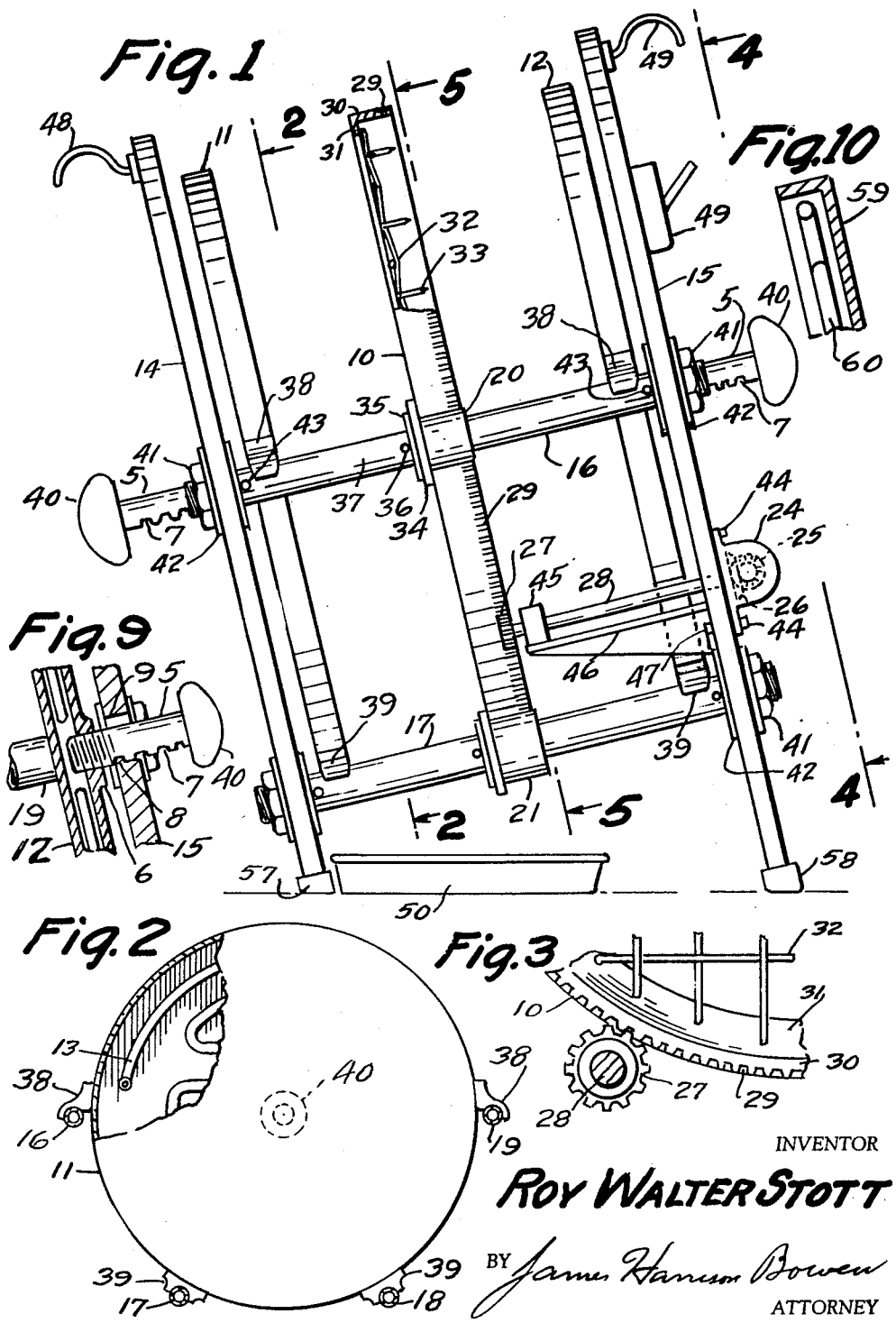

United States Patent Office 2,915,959
Patented Dec. 8, 1959

2,915,959

STEAK COOKER

Roy W. Stott, Evergreen Park, Ill.

Application December 19, 1958, Serial No. 781,553

8 Claims. (Cl. 99—345)

This invention relates to rotisseries such as used, or that can be used in restaurants, or for display in windows of restaurants, and which are also used for back yard picnics, or in kitchens, sun porches, and the like, and in particular a rotisserie in which a product is retained by pins on an open rotating wheel positioned between a pair of heating elements, and wherein the inclination of the wheel is such that juices dropping from a product over itself or onto the face thereof drop into an L-shaped rim and are carried by the rim upwardly to points from which the juices drop or flow over the product being cooked so that the product is basted continuously while cooking.

The purpose of this invention is to provide an improved steak cooker or rotisserie that is designed for universal use and in which juices dropping from products being cooked are recovered.

Rotisseries have been provided of various types and in various designs, and although many cookers of this type rotate product in front of or above or below a fire or heating element the juices dropping from the products are not recovered and the final products are comparatively dry.

With this thought in mind this invention contemplates a rotisserie in which the product supporting wheel is inclined at a calculated degree whereby juices dropping from a product being cooked are recovered by the rim of the wheel and carried upwardly to points from which the juices may be applied by gravity to the products being cooked.

The object of this invention is, therefore, to provide a cooker for steaks and the like in which juices dropping from the steaks are restored to the steaks.

Another object of the invention is to provide a rotisserie in which products are readily placed on and readily removed from an open wheel freely and removably mounted between heating discs.

Another important object of the invention is to provide a rotisserie in which an open wheel upon which products are carried is rotated continuously as products thereon are cooked.

A further object of the invention is to provide a rotisserie in which products are carried on an open wheel between heating elements in which the wheel rests freely on collars so that it may readily be removed for cleaning.

A still further object is to provide a rotisserie having an open wheel with pins for supporting products thereon in which the wheel is not mechanically connected to the machine and is positioned at such an angle that juices dropping from products thereon are recovered and returned to the products, in which the rotisserie is of a simple and economical construction.

With these and other objects and advantages in view the invention embodies a pair of inclined end plates connected and supported by tubular rods having aligned collars rotatably mounted thereon, an open wheel resting on and mounted to rotate on the collars, enclosed or open discs with heating elements therein also mounted on the end plates and positioned on opposite sides of the wheel, and a motor for rotating the wheel.

Other features and advantages of the invention will appear from the following description taken in connection with the drawings, wherein:

Figure 1 is a side elevational view of the improved steak cooker illustrating the relative positions of the parts and in which a portion of a rim of a wheel is broken away to show wire mesh and product holding points therein.

Figure 2 is an elevational view, taken on line 2—2 of Figure 1, with the parts shown on a reduced scale, showing one of the heating element housing discs, and with other parts omitted.

Figure 3 is a section taken substantially on line 5—5 of Figure 1, showing a pinion for rotating a product holding wheel with the parts shown on an enlarged scale and with other parts omitted.

Figure 4 is an end elevational view of the rotisserie taken on line 4—4 of Figure 1, and with the parts shown on a reduced scale.

Figure 5 is an elevational view of the product retaining wheel, taken on line 5—5 of Figure 1, with the parts shown on a reduced scale, showing the wheel freely mounted on the collars on the tubular rods extended between the end plates.

Figure 6 is a view showing one of the wheel retaining collars with the rim of the wheel shown in section and positioned on the collar.

Figure 7 is a cross section through the rim of the product carrying wheel with the parts shown on an enlarged scale and with parts broken away.

Figure 8 is a view showing a suggested wiring diagram for connecting the parts to a source of current supply.

Figure 9 is a longitudinal section showing the adjustable mounting of the heating element discs in the end plates Figure 10 is a view showing a modification wherein the inner surfaces of the heating element discs are open instead of being closed, as shown in Figure 1.

Referring now to the drawings wherein like reference characters denote corresponding parts the improved steak cooker of this invention includes a steak retaining wheel 10, enclosed discs 11 and 12 having heating elements 13 therein, end plates 14 and 15 for supporting the parts, tubular rods 16, 17, 18 and 19 extended between and mounted in the plates providing braces for supporting the end plates in inclined positions, collars 20, 21, 22 and 23 rotatably mounted on the tubular rods and upon which the wheel 10 is freely mounted, and a motor 24 for rotating the wheel.

The wheel is rotated by the motor through a bevel gear 25 on the shaft of the motor which meshes with a bevel gear 26 that drives a pinion 27 on a shaft 28, and the pinion is positioned to mesh with teeth or notches 29 in the periphery of a rim 30 of the wheel 10.

The rim 30 of the wheel 10 is provided with an inwardly extended annular flange 31 upon which wire mesh 32, which extends over the inner area of the wheel, is removably mounted, and the wire mesh is provided with pins 33 upon which steak, chops, hot dogs, toast, or the like may be placed. With the wheel rotating freely upon the collars, juices from the steak drop over the product or into the L-shaped rim of the wheel and are carried upwardly to points above the steak, from which the juices drop or flow over the steak thereby continuously basting products being cooked. The collars are provided with flanges 34 and washers 35 are positioned between the flanges and pins 36 in spaced openings 37 in the tubular rods. By this means the wheel 10 may be adjusted in relation to the heating elements. The wire mesh 32 is removable from wheel 10.

The discs 11 and 12, in which the heating elements 13 are positioned are slidably mounted on the tubular rods by lugs 38 on the upper rods 16 and 19, and 39 on the lower rods 17 and 18, and the positions of the discs are adjusted by raising knobs 40 on studs 5 which are threaded in hubs 6 in the sides of the discs, and the lower sides of the studs are provided with notches 7 that are positioned over lugs 8 in openings 9 of the end plates 14 and 15. By this means the knobs 40 may be raised to disengage the notches and lugs and the discs may be moved by sliding the lugs 38 and 39 on the tubular rods.

The ends of the tubular rods are threaded and the rods are secured in positions in the end plates by nuts 41 that clamp washers 42 against the surfaces of the end plates, and also against pins 43 that extend through the tubular rods.

In the design shown the motor 24 is mounted on the end plate 15 by bolts 44, and the extended end of the shaft 28 is rotatably mounted in a bearing 45 on a bracket 46, also secured to the end plate 15, by bolts 47. It will be understood, however, that the motor may be located in any suitable position, and may be operatively connected to the wheel 10 by suitable means. It will also be understood that the motor may be omitted and the wheel rotated by hand or other means.

Handles 48 and 49 are positioned on upper ends of the end plates to facilitate carrying the rotisserie, and a drip pan 50 may be provided below the wheel 10 to catch stray juices dripping from products on the wheel. The rotisserie may also be provided with a transparent cover to protect products from dust and the like, and to hold the heat, if desired.

The heating elements are controlled by a switch or by a thermostat or rheostat 51 by which different degrees of heat may be applied to products on the wheel 10, and a timer 52, both of which may be positioned on the end plate 15, and the parts may be connected to a source of electric current by wires 53 and 54. The wire 53 is connected to one terminal of the timer, and the opposite terminal of the timer is connected to the switch 51 by a wire 55. The other supply wire 54 is connected to the motor 24 and the opposite terminal of the motor is connected to the switch 51 by a wire 56. This circuit is only typical, as it will be understood that the parts may be connected in any suitable manner.

The lower edges of the end plates 14 and 15 are provided with channel shaped caps 57 and 58 which are formed of rubber, or other resilient material.

In the design shown in Figure 10 a disc 59, similar to the discs 11 and 12 is open on the side facing the wheel 10 whereby heat from heating elements 60 radiates directly upon a product being cooked.

Operation

With the parts assembled as illustrated and described a steak, chops, hot dogs, toast, or other products may be placed on the pins 33 of the wheel 10, and with electric current supplied to the heating elements 13 and motor, the steak or other product is subjected to heat from both sides as the wheel 10 is rotated slowly and juices dropping from the steak roll over the product or are caught in the L-shaped rim of the wheel. With the rotation of the wheel continued the juices are carried upwardly and drop by gravity upon the steak or other product. By this means all juices are recovered and restored to the product being cooked.

With the wheel resting freely on the collars it is easily rotated and the wheel may readily be picked up and cleaned or repaired.

The parts may be made of any suitable materials, and the materials may be of suitable colors.

It will be understood that modifications within the scope of the appended claims may be made in the design and arrangement of the parts without departing from the spirit of the invention.

What is claimed is:
1. A steak cooker comprising upwardly disposed inclined end plates, rods extended between and mounted in said end plates, collars rotatably mounted on the rods and positioned in a common plane normal to the rods, a wheel having a rim L-shaped in cross section and supported whereby the parts provide a trough, said wheel resting on the collars and being free to rotate thereon, a circular layer of wire mesh with product retaining pins extended therefrom positioned in the rim of the wheel, the collars, rods, and end plates positioning the wheel at such an angle that juices from a product on the wheel run over the surface of the product, and juices dropping from the product are caught by the rim of the wheel, carried upwardly by the trough in the rim, and deposited on the product from points above said product.

2. A rotisserie comprising upwardly disposed inclined end plates, parallel rods extended between and mounted in the end plates, collars with flanges on lower ends thereof rotatably mounted on the rods, an open wheel having a rim L-shape in cross section resting on the collars and positioned whereby the parts provide a trough, a circular layer of wire mesh with product retaining points extended therefrom positioned in the rim of the wheel, the collars, rods, and end plates positioning the wheel at such an angle that juices from a product on the wheel run over the surface of the product, and juices dropping from the product are caught by the trough of the rim of the wheel, carried upwardly by said rim and deposited on the product from a point above said product.

3. A rotisserie comprising parallel upwardly disposed inclined end plates, spaced tubular rods extended between and mounted in the end plates, collars having flanges on lower ends thereof mounted to rotate on the tubular rods and positioned substantially midway between the end plates, a circular rim having wire mesh extended across the inner portion freely positioned on the collars, product retaining points extended from the wire mesh, the collars, rods, and end plates positioning the wheel at such an angle that juices from a product on the wheel run over the surface of the product, and juices dropping from the product are caught by the rim of the wheel, carried upwardly by said rim, and deposited on the product from points above said product, heating elements carried by the tubular rods and positioned on opposite sides of the rim, and means for rotating the rim.

4. A rotisserie as described in claim 3, in which the rim and heating elements are adjustably mounted.

5. In a rotisserie, the combination which comprises spaced parallel upwardly disposed inclined end plates, tubular rods extended between and positioned with the ends secured in the end plates providing supporting means for the end plates, collars having flanges on lower ends thereof mounted to rotate on the tubular rods and positioned in an inclined plane normal to the axes of the tubular rods, a wheel including an L-shaped rim resting on the collars and positioned to rotate thereon, wire mesh having product retaining points extended therefrom freely positioned in the rim and readily removable therefrom, means for rotating the wheel, discs with heating elements therein slidably mounted on the tubular rods and positioned on opposite sides of the wheel, the collars, rods, and end plates positioning the wheel at such an angle that juices from a product on the wheel run over the surface of the product, and juices dropping from the product are caught by the rim of the wheel, carried upwardly by said rim, and deposited on the product from points above said product, and handles on upper ends of the end plates.

6. In a rotisserie as described in claim 5, means for adjusting the positions of the discs on the tubular rods and in relation to the wheel.

7. A rotisserie as described in claim 5, in which the wheel rotating means includes a motor operatively connected to a pinion in meshing relation with teeth on the rim of the wheel.

8. A rotisserie as described in claim 5, in which lugs positioned on the periphery of the discs rest on the tubular rods and the positions of the discs in relation to the wheel are adjusted by knobs on the ends of stems extended from the discs and having notches in the lower surfaces which are positioned over lugs in openings in the end plates.

References Cited in the file of this patent

UNITED STATES PATENTS

| | | |
|---|---|---|
| 1,531,517 | Simmons | Mar. 31, 1925 |
| 1,634,142 | Hammond | June 28, 1927 |
| 1,865,354 | Brunner | June 28, 1932 |
| 1,937,416 | Smith | Nov. 28, 1933 |
| 2,047,046 | Wade | July 7, 1936 |
| 2,400,640 | Hanson et al. | May 21, 1946 |
| 2,646,495 | Dornbush | July 21, 1953 |
| 2,722,172 | Garbo | Nov. 1, 1955 |